UNITED STATES PATENT OFFICE.

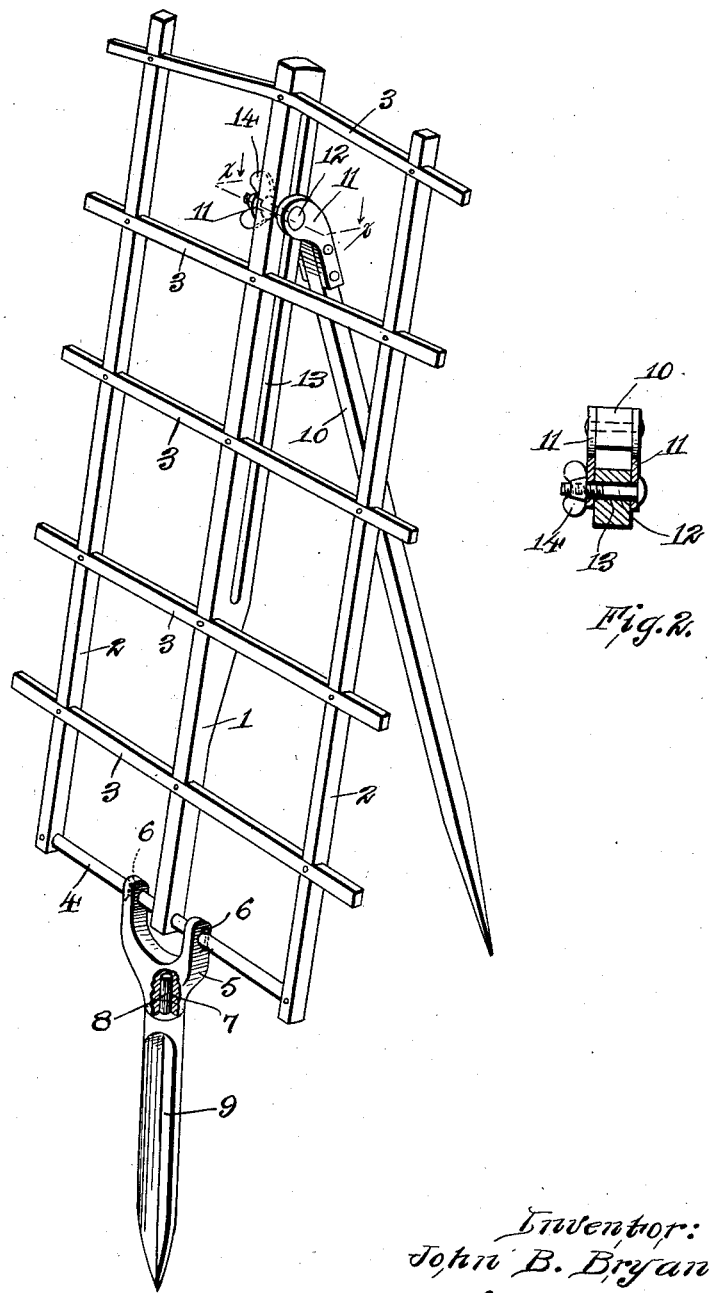

JOHN B. BRYAN, OF DOWNERS GROVE, ILLINOIS.

VINE-TRELLIS.

1,063,502.

Specification of Letters Patent.

Patented June 3, 1913.

Application filed September 21, 1912. Serial No. 721,629.

*To all whom it may concern:*

Be it known that I, JOHN B. BRYAN, a citizen of the United States, and a resident of the city of Downers Grove, county of Dupage, and State of Illinois, have invented certain new and useful Improvements in Vine-Trellises, of which the following is a specification.

My invention relates to improvements in vine trellises and has for its object the production of a trellis of this character designed for use especially in conjunction with tomato vines or similar plants.

A further object is the production of a trellis as mentioned, through the medium of which the plants or vines may be confined to limited space and have their positions adjusted so as to facilitate cultivation thereof.

A further object is the production of a trellis through the employment of which the fruit of a tomato vine or the like will be held elevated above the ground so as to facilitate gathering or picking thereof and so that the fruit will be exposed so as to obtain the greatest sunlight and ventilation and thereby aid in the growth and ripening of the fruit.

Other objects will appear hereinafter.

The invention consists in the arrangements and combinations of parts hereinafter fully described and claimed.

The invention will be best understood by reference to the accompanying drawings forming a part of this specification, and in which—

Figure 1 is a perspective view of a vine trellis embodying my invention, a portion of the construction being broken away for the sake of clearness, and Fig. 2 is an enlarged sectional view taken on substantially line *x—x* of Fig. 1.

The preferred form of construction as illustrated in the drawings comprises a trellis consisting of a body or frame work, which is composed of spaced longitudinal members 1 and 2 and spaced transverse members 3 and 4 which rigidly connect members 1 and 2, said members 3 being sunk in notches provided for the reception thereof in the edges of said members 2, as clearly shown.

Swingingly mounted upon the lowermost transverse bar 4 is a socket member 5, said member 5 being held against longitudinal movement upon the member 4 by means of cotter pins 6 which engage against the outer sides of the arms constituted at the bifurcated upper end of said member 5. Provided in the lower end of the member 5 is a cylindrical socket 7 adapted, when the device is in use, to loosely receive the reduced upper end portion 8 of an anchoring post 9. The post 9, when the device is in use, is adapted to be driven into the ground adjacent the base of the plant in conjunction with which the trellis is employed, the socket member 5, after the post 9 has been driven into the ground, being engaged with the upper end of the latter so as to permit of rotary adjustment of the trellis body or frame.

The trellis body or frame is held in positions of tilting and rotary adjustment by means of a brace bar 10 which is arranged at one side of the frame, tiltably and adjustably connected thereto. The connection of the upper end of bar 10 with the trellis frame comprises two ears or plates 11 which are rigidly secured at opposite sides of the upper end of bar 10, a bolt 12 passing through the bifurcated outer ends of said ears or plates loosely engaging an elongated slot 13 which is provided in the central longitudinal bar 1. A thumb nut 14 threaded upon one end of the bolt 2 evidently affords means for clamping the upper end of bar 10 in positions of longitudinal adjustment relative to the trellis frame. The lower end of the bar 10 is pointed for piercing the ground.

With a device of the construction set forth it will be seen that the vine adjacent to which the trellis is arranged will climb upon the body of the trellis engaging with the bars 1, 2, 3 and 4. The plant will be thus confined to limited space and prevented from roaming about and covering considerable area such as is now generally the case. By reason of the tiltable and rotatable adjustment afforded the trellis frame or body, the same together with the plant arranged thereon, may be adjusted to any desired position to permit of the passage of a horse and cultivator in the cultivating operation.

The device is simple and economical in construction and hence may be manufactured at a low cost, and will be found of high efficiency in use.

While I have illustrated and described the preferred form of construction for carrying my invention into effect, this is capable of variation and modification without departing from the spirit of the invention. I, therefore, do not wish to be limited to the precise details set forth, but desire to avail myself of such variations and modifications as come within the scope of the appended claims.

Having described my invention what I claim as new and desire to secure by Letters Patent is:

1. A vine trellis comprising a frame; an anchoring post adapted to be driven into the ground; a tiltable rotatable connection between said post and the base of said frame; and means for locking said frame in positions of tilting and rotary adjustment, substantially as described.

2. A vine trellis comprising a frame; an anchoring post adapted to be driven into the ground; a tiltable rotatable connection between said post and the base of said frame; and means adapted to pierce the ground for locking said frame in positions of tilting and rotary adjustment, substantially as described.

3. A vine trellis comprising a frame; an anchoring post adapted to be driven into the ground; a tiltable rotatable connection between said post and the base of said frame; and a member having one end pivotally connected with said member and having its other end pointed for piercing the ground for locking said frame in positions of tilting and rotary adjustment, substantially as described.

4. A vine trellis comprising a frame; an anchoring post adapted to be driven into the ground; a tiltable rotatable connection between said post and the base of said frame; and a frame having one end pivotally and longitudinally adjustably connected with said frame and having its other end pivoted for piercing the ground, for locking said frame in positions of tilting and rotary adjustment, substantially as described.

5. A vine trellis comprising a frame; an anchoring post adapted to be driven into the ground; a tiltable rotatable connection between said post and the base of said frame; and an elongated brace bar at one side of said frame having one end adjustably secured to said frame by means of a bolt passing through an elongated slot provided in said frame, the opposite end of said bar being pointed for piercing the ground, substantially as described.

6. A vine trellis comprising a frame, consisting of a plurality of spaced vertically extending bars and a plurality of spaced transversely extending bars; an anchoring post adapted to be driven into the ground; a socket member swingingly connected with the lowermost of said transverse bars having a socket in its lower end loosely engaging with the upper end of said base; and means for locking said frame in positions of tilting and rotary adjustment, substantially as described.

In testimony whereof I have signed my name to this specification in the presence of two subscribing witnesses.

JOHN B. BRYAN.

Witnesses:
V. J. MANSON,
LEVI MERTZ.

Copies of this patent may be obtained for five cents each, by addressing the "Commissioner of Patents, Washington, D. C."